April 25, 1939.  R. L. IRWINE ET AL  2,155,973
FILTER FORMING MACHINE
Filed June 17, 1938  8 Sheets-Sheet 4

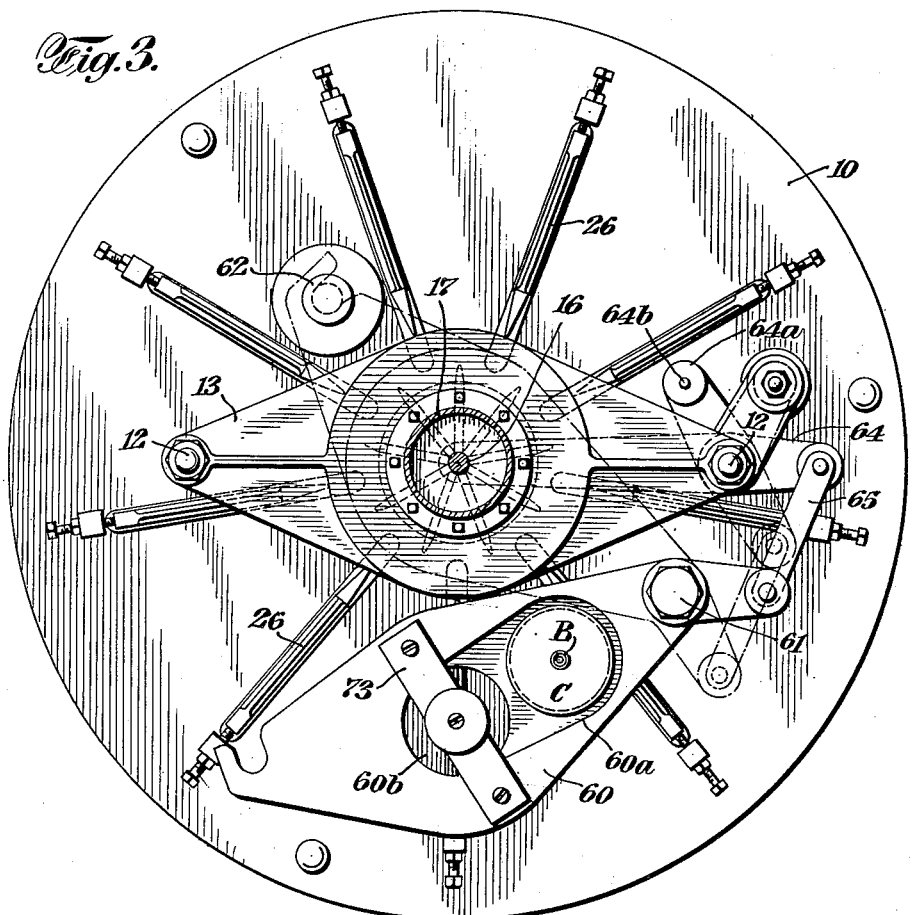
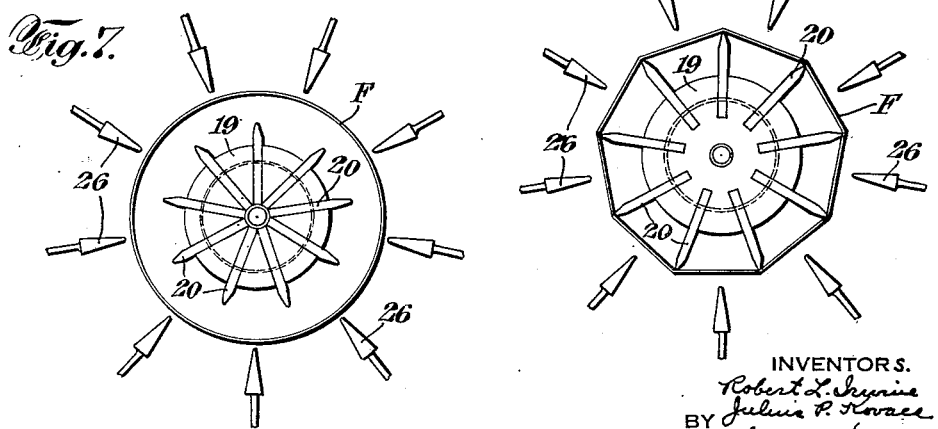

INVENTORS.
Robert L. Irwine
BY Julius P. Kovacs
Kenyon & Kenyon
ATTORNEYS

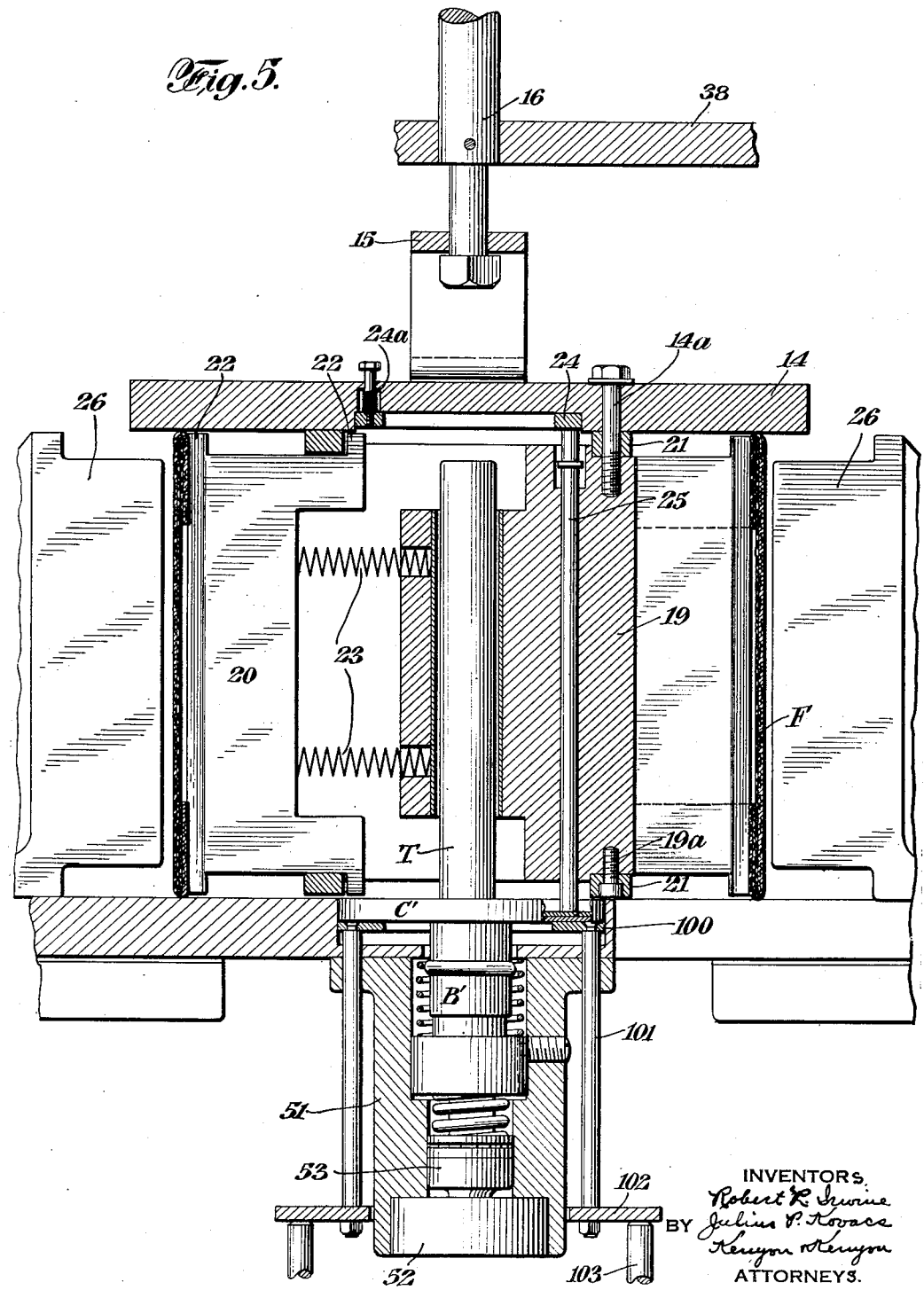

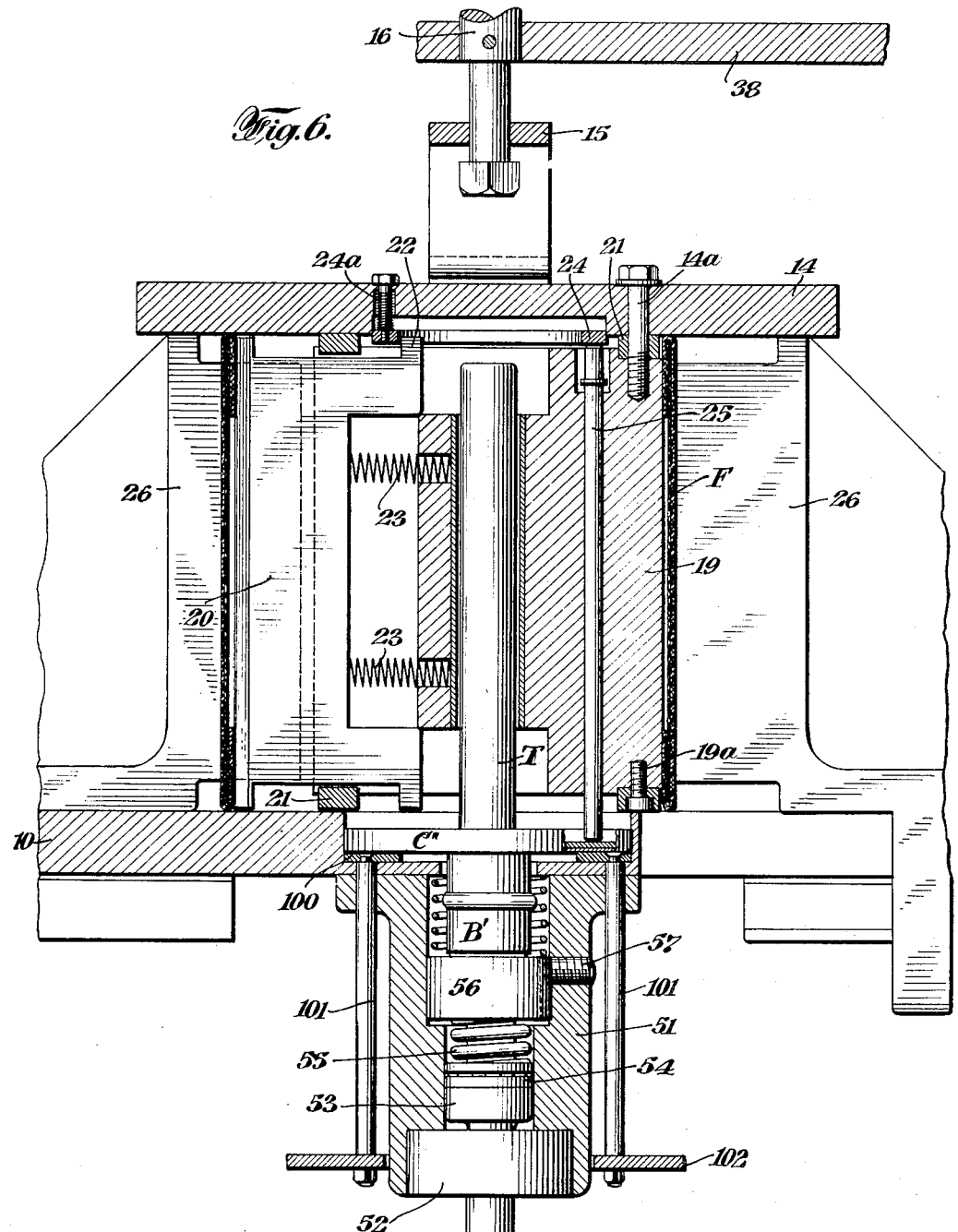

April 25, 1939.  R. L. IRWINE ET AL  2,155,973
FILTER FORMING MACHINE
Filed June 17, 1938  8 Sheets-Sheet 7
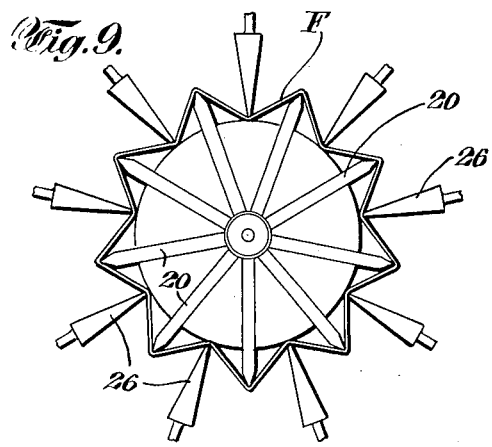
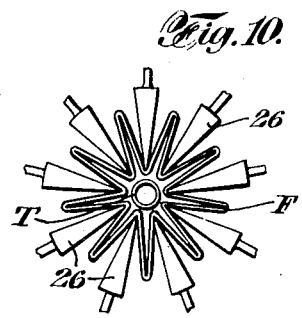
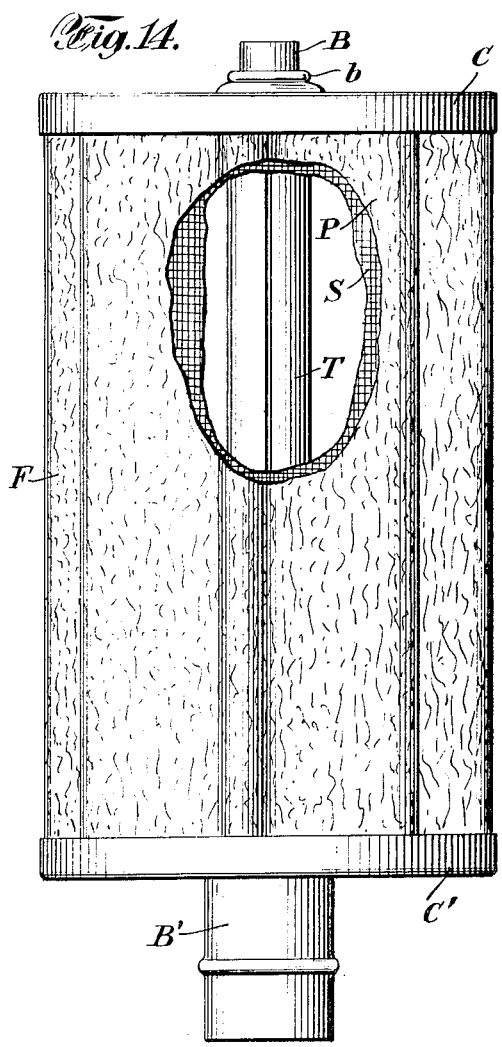
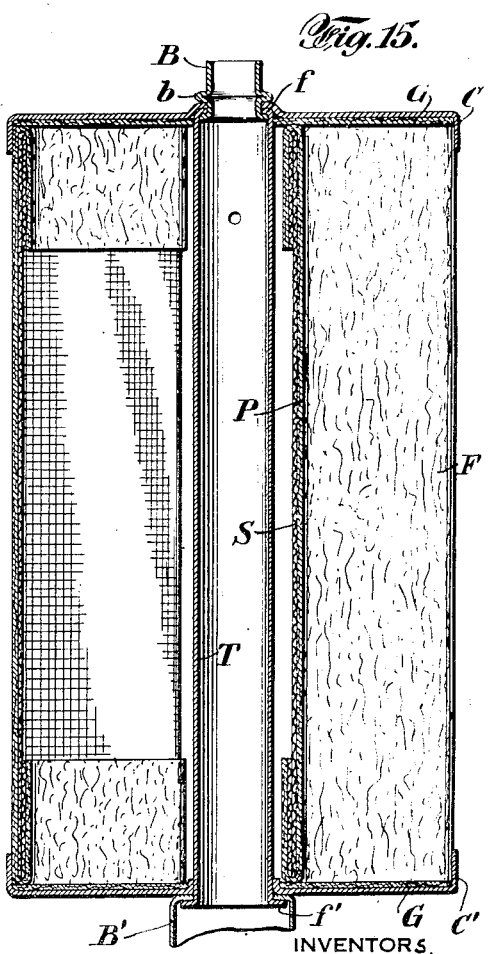
INVENTORS.
Robert L. Irwine
BY Julius P. Kovacs
Kenyon & Kenyon
ATTORNEYS.

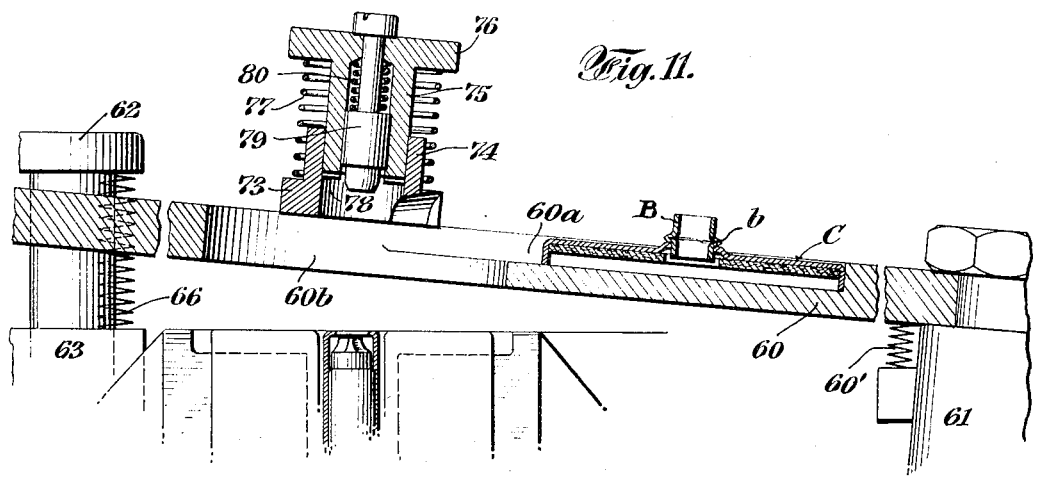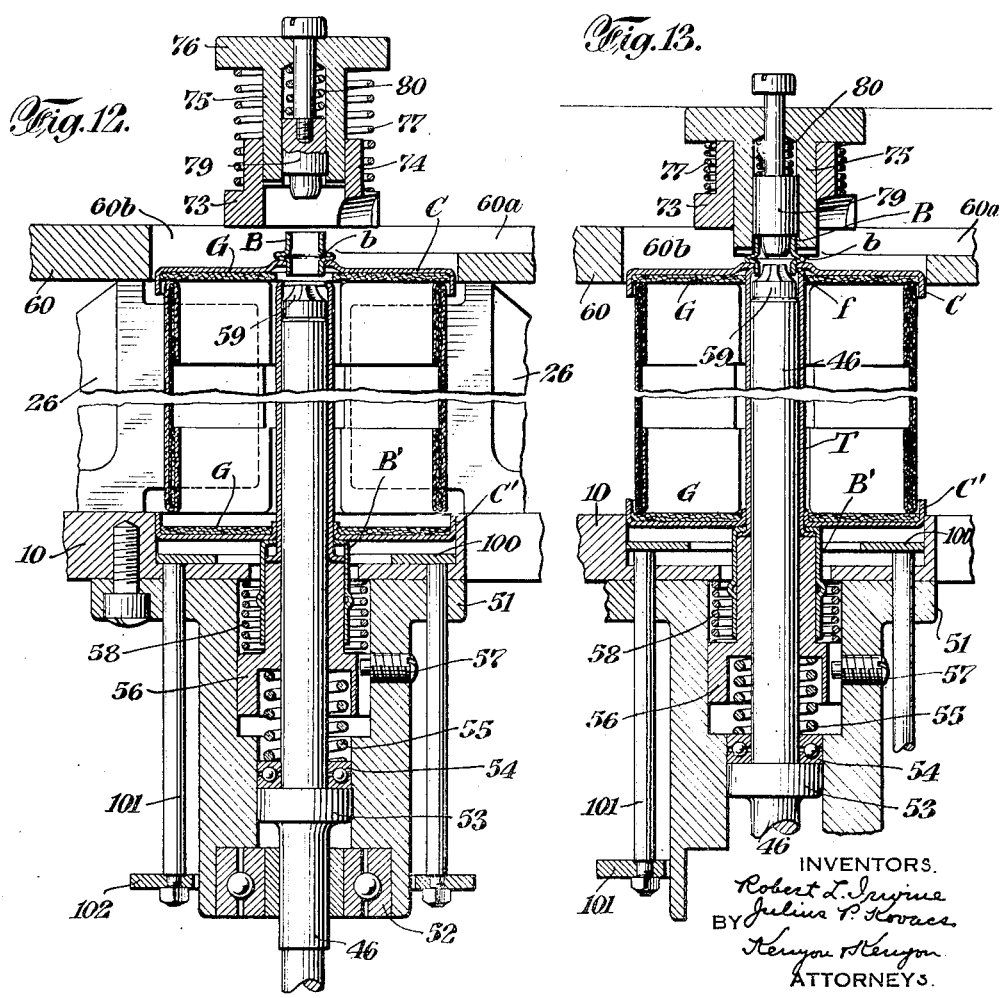

Patented Apr. 25, 1939

2,155,973

UNITED STATES PATENT OFFICE 2,155,973

FILTER FORMING MACHINE

Robert L. Irwine, Union, and Julius P. Kovacs, Newark, N. J., assignors to Motor Improvements, Inc., Newark, N. J., a corporation of Delaware Application June 17, 1938, Serial No. 214,182

20 Claims. (Cl. 153—70)

This invention relates to machines for forming filter units and more particularly to a machine for forming filter units of the type disclosed in Lewis W. Williams co-pending application, Serial No. 172,982.

Such filtering element consists of an endless strip of reticulated material formed into a member of star-shaped cross-section and provided with a covering of filtering paper or other similar material. In the formation of such a filter unit, the reticulated material and filtering material both in the form of a cylinder are assembled with the filtering material surrounding the reticulated material. The composite cylinder is then pressed inwardly at spaced points to produce the desired star-shaped configuration after which the ends are suitably capped.

An object of this invention is to provide a machine which will quickly and accurately form the assembly of reticulate material and filtering material into star-shaped configuration and apply caps to the ends thereof to produce a complete filtering unit.

Other objects, novel features and advantages of this invention will become apparent from the following specification and accompanying drawings, wherein:

Fig. 3 is a plan view;

Figs. 5 and 6 are enlarged vertical sections of the expanding mandrel in different positions;

Figs. 7, 8, 9 and 10 illustrate diagrammatically the sequence of forming operations;

Figs. 11, 12 and 13 are fragmentary vertical sections substantially on the line 11—11 of Fig. 3 showing different stages of operation;

Fig. 14 is an elevation partially broken away of a finished filtering unit, and

Fig. 15 is a section through a finished filtering unit.

In Figs. 14 and 15 is illustrated the filtering unit produced by the machine embodying the invention. This filtering unit comprises a filtering medium F having the cross-sectional configuration illustrated in Fig. 10 and consisting of a length of wire screen S overlaid by a length of filter paper P, the top and bottom edges of which are turned over the top and bottom edges of the screen. A flanged cap C fits over end of the filtering medium F and a flanged cap C' fits over the other end of the filtering medium, a gasket G being interposed between each cap and the end of the filtering medium. A metal tube T extends through the center of the filtering medium and acts to hold the caps in assembled relation to the filtering medium as well as to provide a discharge passage for filtered liquid. The lower end of the tube T is provided with an outwardly extending flange f' which engages an inwardly directed flange on the bushing B' to clamp the bushing against the cap C' and hold the latter in contact with the lower end of the filtering medium. The upper end of the tube T is provided with an inwardly projecting flange f, the inner surface of which is engaged by an outwardly extending flange on the bushing B to clamp the tube and cap C between it and a rib b formed on the bushing, thereby completing the assembly of the filtering unit and holding the cap C in fixed relation with the upper end of the filtering medium F.

Figure 1:
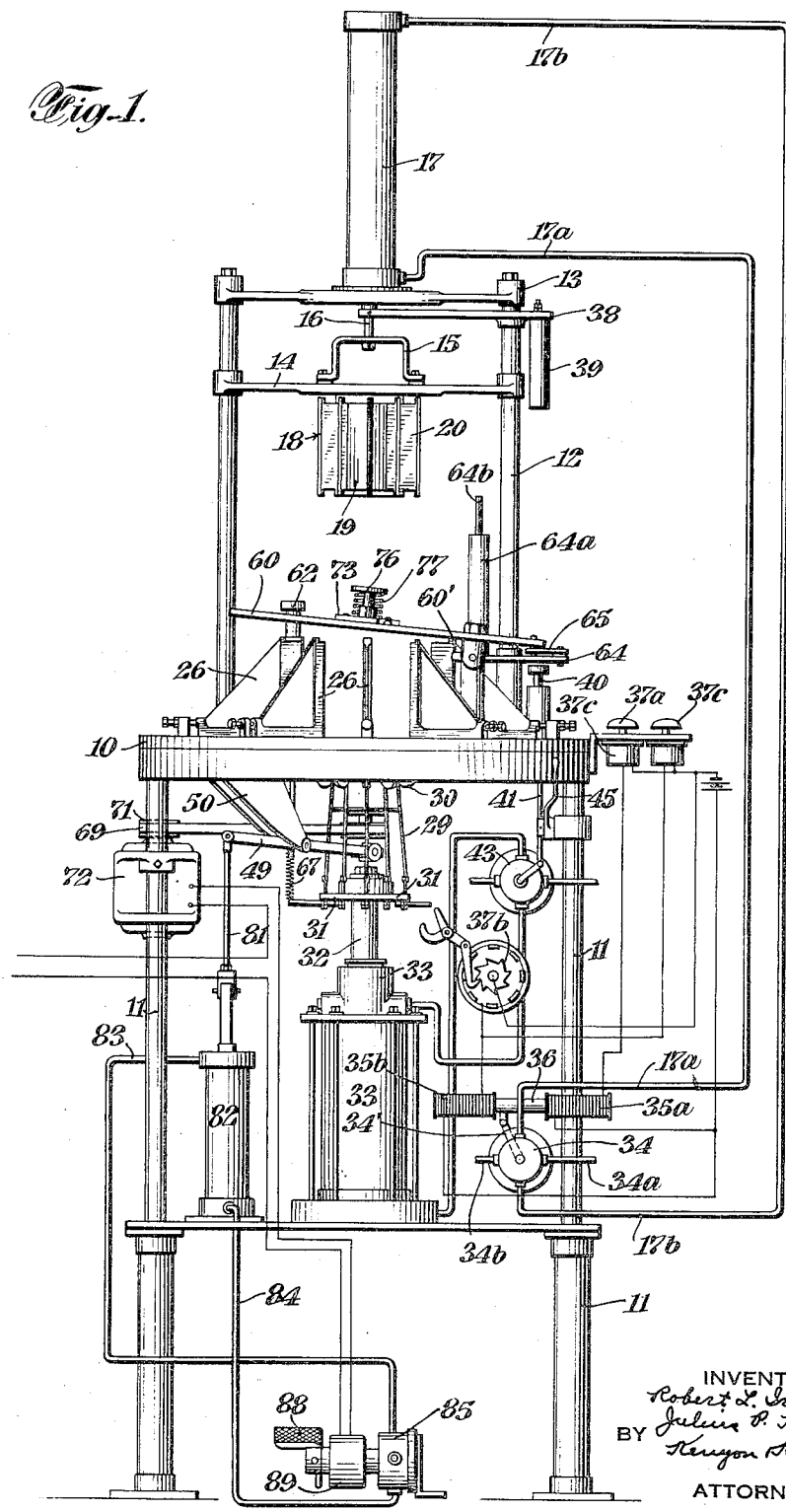
Fig. 1 is a side elevation, partly schematic, of a machine embodying the invention.
Figure 2:
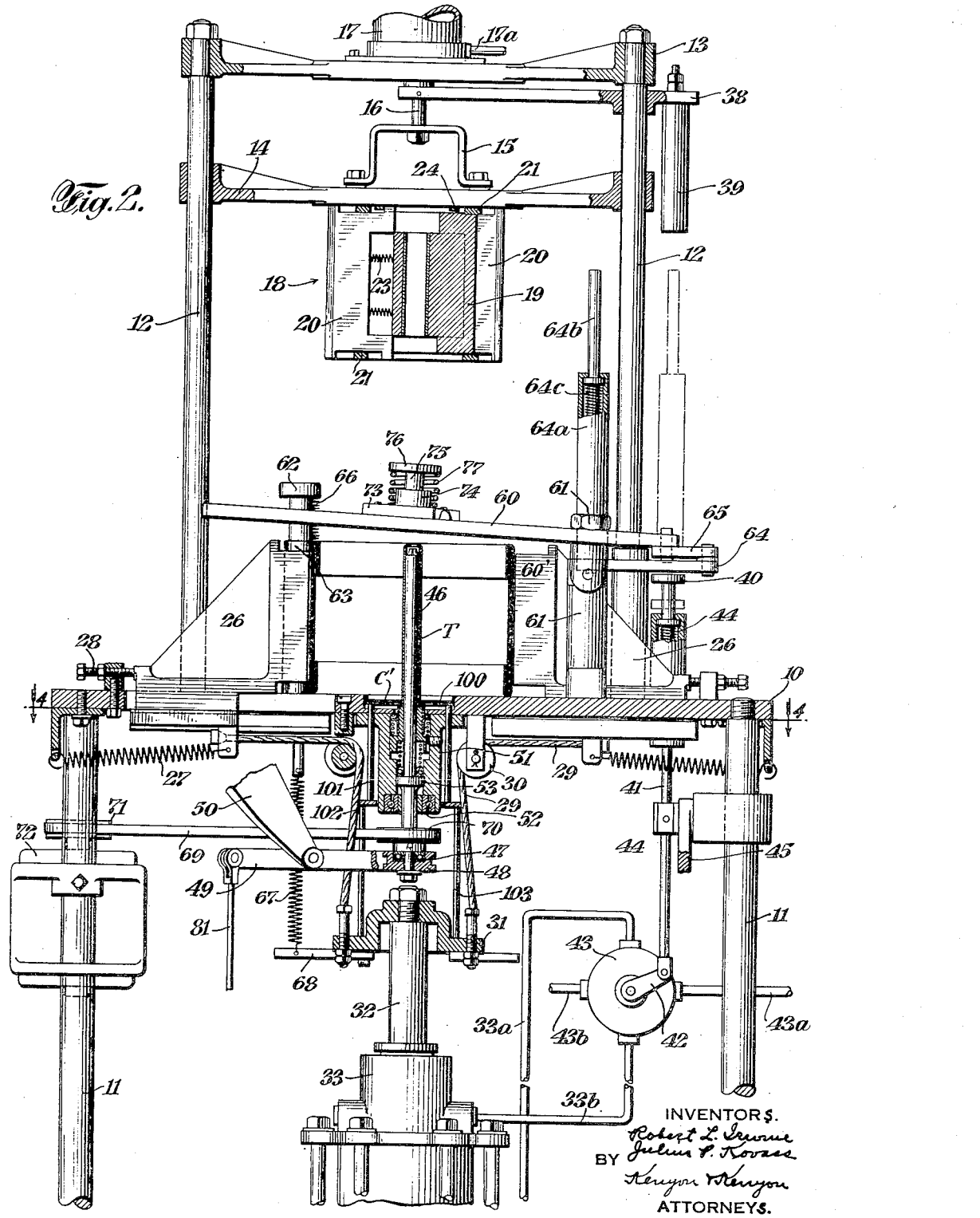
Fig. 2 is an enlarged fragmentary side elevation partially in section.

Referring now more especially to Figs. 1 to 6 inclusive, a bed 10 is supported by suitable legs 11. Supports 12 extend upwardly from the bed 10 and are connected at their upper ends by a frame 13. A head 14 is slidably mounted on the supports 12 and is provided with a bracket 15 to which is attached one end of a rod 16, by a lost motion connection, the other end of which is connected to a piston arranged within the cylinder 17 supported by the frame 13 (Figs. 1 and 2). By means of bolts 14a, the head 14 carries an expansible mandrel 18 which consists of a cylindrical body portion 19 having radial slots in which are mounted the slides 20 having lugs 22 at their ends (Fig. 5). A cap 21 is attached to each end of the body 19 by bolts 14a and 19a respectively and each slide is pressed outwardly by springs 23, the extent of movement of the slides being limited by engagement of the lugs 22 with the cap 21. A ring 24 normally engages said lugs 22 to maintain the slides 20 in retracted position, (Fig. 6). To the ring are connected rods 25 which extend below the lower end of the mandrel and springs 24a provided to maintain the ring 24 and rods 25 in the position shown in Fig. 6. Upward movement of the rods 25 lifts the ring 24 out of engagement with the lugs 22, thereby allowing the springs 23 to project the slides into the position shown in Fig. 5 with the ring 24 clearing the top lugs 22.

The bed 10 is provided with a plurality of radial slots through which extend portions of the slides or plungers 26 supported by the bed. A spring 27 is attached to each slide 26 and these springs tend to draw the slides into engagement with the adjustable stops 28 mounted on the bed. A cable 29 is attached at one end to each slide 26, passes over a pulley 30 supported by the bed 10 and is connected to a head 31. The head 31 is carried by a rod 32 extending into a cylinder 33 and being connected to a piston in said cylinder. Downward movement of the rod 32 draws the slides 26 into their innermost positions and upward movement of the rod 32 permits the springs 27 to return the plunger 26 to the position shown in Fig. 2.

To the top and bottom of the cylinder 17 (Fig. 1) are connected the pipes 17b and 17a which communicate with ports of a valve 34. A pipe 34a leads to the valve 34 from a supply of compressed air and the valve is provided with an exhaust port 34b. The valve 34 has an operating arm 34' connected to the armature 36 of a solenoid having two windings 35a and 35b. Current flow through the winding 35a is controlled by a normally open manually-operated switch 37a and flow from the winding 35b is controlled by a limit switch 37b (shown schematically in Fig. 1) which is normally open but is momentarily closed and instantly reopened by the head 31 near the end of its downward movement through the medium of a ratchet and pawl arrangement. On its upward movement the head 31 returns the pawl to its original position without affecting the switch.

In the rest position of the machine, the pipe 34a is in communication with the pipe 17a and the pipe 17b is in communication with the port 34b and both switches 37a and 37b are open. When the switch 37a is closed, the winding 35a is energized to move the armature 36 to actuate the valve arm 34' to connect the pipe 17a to the port 34b and connect the pipe 17b to the pipe 34a and the valve will remain in such position until the switch 37b is closed by the head 31 whereupon the winding 35a is energized to move the valve arm 34' to connect the pipe 17b to the port 34b and the pipe 17a to the pipe 34a (Fig. 1).

A slide 38 (Fig. 2) is carried by one of the supports 12 for reciprocation with the head 14 and is provided with a lug 39 engageable, after downward movement, with the head 40 of a rod 41 slidably supported by the bed 10 and attached to the operating arm 42 of a valve 43. The valve 43 controls the flow of compressed air to and from the ends of the cylinder 33 through an inlet pipe 43a and an exhaust port 43b and the pipes 33a and 33b leading to the ends of the cylinder 33 from the valve 43. The rod 41 is normally held in elevated position by a spring 44 with the arm 42 in such position that the supply of air is in communication with the bottom of the cylinder and the top of the cylinder is in communication with atmosphere. When the lug 39 engages the head 40 it moves the rod 41 to bring the arm 42 into such position that the supply of compressed air is in communication with the top of the cylinder and the bottom of the cylinder is in communication with atmosphere, thus causing the rod 32 to move downwardly and draw the slides 26 inwardly. The lost motion connection between the rod 16 and the head 14 is such that the wings 20 of the mandrel 18 are released and moved to their outermost position before the plungers 26 begin their inward movement.

The bed 10 is provided with a central recess in which is arranged a ring or platform 100 and also a shaft 46 which will later be described in connection with other parts of the machine. The ring 100 is supported by four slidable rods 101 which are connected to a ring 102. A plurality of rods 103 are carried by the head 31 and a ring 102 rests upon the upper ends of the rods (Figs. 2, 5 and 6).

In the forming operation, the filtering medium F in the form of a cylinder is placed on the bed 10 in the space between the inner ends of the slides 26 with the head 14 in the position shown in Fig. 1 and an assembly consisting of a cap C', tube T and bushing B is positioned in the machine with the cap C' resting on the ring 100 and the tube T' with bushing B' surrounding the shaft 46, (Figs. 2, 5 and 6). The switch 37a is then closed to actuate the valve 34 to supply compressed air to the top of the cylinder 17, thereby causing downward movement of the head 14. As the mandrel 18 nears the bed 10, the slides 26 and 20 bear the relation to the cylindrical filtering medium F shown in Fig. 7 and the wings 20 are held in retracted position by the ring 24 (Fig. 6). When the rods 25 engage the cap C' which is firmly supported by the ring 101, the ring 24 is disengaged from the lugs 22 and the slides 20 spring into the position shown in Figs. 5 and 8, thus forming the cylinder F into a polygon. After the mandrel 18 has come to rest on the bed, the head 14 continues to move downward through the extent of the lost motion connection between the rod 16 and bracket 19 thereby engaging the lug 39 with the rod 41 to actuate the valve 42 as above described. The rod 32 is caused to move downwardly as previously described, thereby moving the plungers 26 inwardly to the position shown in Figs. 6 and 9 with simultaneous return of the wings 20 to their original position effected by reduction in the overall diameter of the filtering medium F. The downward movement of the head 31 results in downward movement of the ring 100 with subsequent disengagement of the rods 103 from the ring 102 (Fig. 6) and cap C' to permit the rods 25 to be moved by the springs 24a to bring the ring 24 into latching relation to the slides 20, thereby locking them in their retracted position (Fig. 6). The slides 26 move inwardly until the combination of the filtering medium F and slides 20 prevents their further movement with the rod 32 stopping somewhat above its lowermost possible position. As the head 31 nears the lower limit of its stroke it closes and then opens the switch 37b, thereby actuating the valve 34 to effect upward movement of the head 14 to its original position. As the head moves upwardly, the lug 39 releases the rod 41 and valve 43 is returned to its original position by its spring 44, thereby causing return of the plungers 26 to their original position. On its upward movement, the head 31 does not affect the switch 37b.

The final formation of the cylinder is effected with the mandrel 18 in its inoperative position, by the slides 26 which are again caused to move inwardly by operation of the rod 41 and valve 43 through the medium of the hand lever 45. In the final forming step, the slides 26 move inwardly the full extent of their movement as illustrated in Fig. 10.

Means are provided for applying caps to the ends of the formed filtering unit and assembling these caps in permanent relation with a tube connecting them. The shaft 46 (Figs. 2 and 12) is journalled by means of ball bearings 47 in a yoke 48 carried by the inner end of a lever 49 pivotally supported by a bracket 50. A hub 51 is attached to the lower face of the bed 10 and carries a ball-bearing 52 in which is received the shaft 46. A shoulder 53 on the shaft 46 supports a ball-bearing 54 against which bears the lower end of a spiral spring 55, the upper end of which fits into a recess in a sleeve 56 surrounding the shaft 46, the sleeve 56 being keyed to the hub 51 by the bolt 57 and shaped to receive the bushing B' (Fig.

12). A spring 58, weaker than the spring 55 is interposed between a shoulder on the sleeve 56 and the bed 10. At the upper end of the shaft 46 is provided a rotating spinning tool 59.

A plate 60 (Figs. 2, 3 and 11) is pivotally supported at one end by a post 61 extending upwardly from the bed 10 and is provided with a notch to receive a headed reciprocating post 62 arranged in a boss 63 carried by the bed 10. A spring 60' normally maintains the plate at the inclination shown in Fig. 11. When the plate 60 is so arranged that the post 62 is received within the notch, it overlies a formed filtering unit. The plate is provided with a socket 60a which terminates in an aperture 60b extending through the plate in register with the shaft 46 (Fig. 3).

A lever 64 (Fig. 3) is journalled on one support 12 and is provided with a vertical sleeve 64a in which is slidably mounted a rod 64b normally held in the position shown in Fig. 2 by a spring 64c. The lever 64 is connected to the plate 60 by a link 65, the arrangement being such that when the plate 60 overlies a formed filtering unit, the rod 64b is in alinement with the lug 39 and the rod 41 (Fig. 2). A spring 66 normally holds the post 62 in the position shown in Fig. 2 and the lower end of the post is connected to one end of a spring 67, the other end of which is attached to a bracket 68 carried by the head 31.

A belt 69 passes around a pulley 70 on the shaft 46 and a pulley 71 on the shaft of a motor 72. The motor is supported by one of the legs 11 and is provided with a suitable control switch so that the shaft 46 may be rotated or maintained stationary as desired, (Fig. 2).

On the plate 60 is provided a bridge member 73 which spans the aperture 60b and is provided with a boss 74 in which is slidably mounted a tubular plug 75 having a shoulder 76 (Figs. 3 and 11). A spring 77 is interposed between the shoulder 76 and a shoulder on the bridge 73. The lower end of the plug 75 is provided with serrations or teeth 78 and in the bore of the plug is provided a plunger 79, the lower end of which is of slightly less diameter than the remainder. A portion of the plunger extends through the upper end of the plug 75 and a spring 80 tends to hold the plunger in the position shown in Fig. 11.

Figure 4:
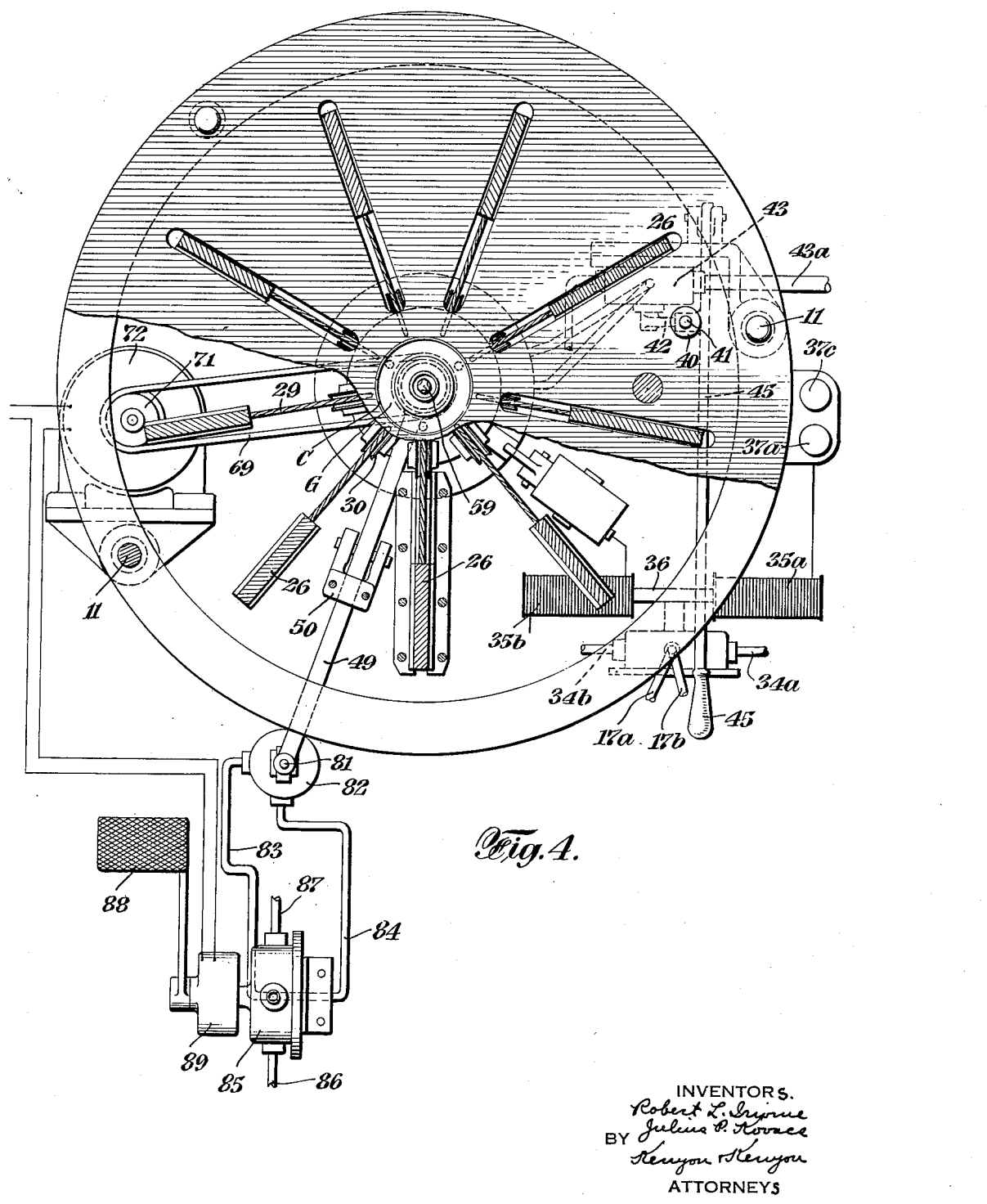
Fig. 4 is a section on the line 4—4 of Fig. 2.

A link 81 (Figs. 1 and 2) connects the lever 49 to the piston of an air cylinder 82 having pipes 83 and 84 leading from its top and bottom respectively to a valve 85 provided with an air supply pipe 86 and an exhaust port 87 (Fig. 4). A treadle 88 is provided for actuating the valve and is normally held in position to connect the pipe 86 to the pipe 84 and the port 87 to the pipe 83 by a spring, not shown. Coaxial with the valve is a switch 89 also operated by the treadle 88 to control the motor 72. In normal position of the treadle, the switch is open, but as the treadle is moved from normal position the switch is first closed, and then the valve turned to connect the pipe 86 to the pipe 83 and the port 87 to the pipe 84. The switch is closed before the valve is sufficiently turned to cause downward movement of the link 81. Thus the operator first starts the motor and then elevates the shaft 46 by operation of the treadle. The lever 49 is provided with a handle which may be used for manual operation of the lever.

In the capping operation, a cap C with inserted bushing B is arranged in the socket 60a and with the head 14 in elevated position the plate 60 is swung from the position shown in full lines in Fig. 3 to the position shown in dotted lines in Fig. 3, and in Fig. 11, thereby putting the post 64b into alinement with the rod 41 and lug 39 and enclosing the post 62 with the notch in the plate. The hand lever 45 (Fig. 2) is operated to actuate the valve 42 and thereby energize the cylinder 33 so that the head 31 moves downwardly, thereby pulling in the slides 26 to their innermost positions. Downward movement of the head 31 exerts a pull on the spring 67 to move the rod 62 downwardly and thus bring the plate 60 into contact with the boss 63. The head 31 trips the switch 37b which has no effect since the head 14 is now in raised position and the valve arm 34' is in the position shown in Fig. 1. The cap C is then slid along the slot 60a and dropped through the aperture 60b on to the formed filtering unit as shown in Fig. 12. Next, the switch 37a is closed whereupon, as previously described, air is supplied to the cylinder 17 to move the head 14 downwardly to bring the bottom of the mandrel into contact with the top of the plug 75 and move it downwardly until it engages the boss 74 as shown in Fig. 13. The reduced end of the plunger enters the bushing B and the teeth 78 engage the rib b on the bushing to prevent rotation thereof. When this relationship is established, the head 14 comes to rest with the lug 39 engaging the upper end of the post 64 and depressing the latter to hold it in contact with the post 41, thereby permitting the operator to release the handle 45 without any possibility of the rod 41 moving upwardly to reverse the setting of the valve 43. The treadle 88 (Fig. 4) is now actuated to close the motor control switch 89 and operate the valve 85, thereby causing rotation of the shaft 46 and upward movement of the lever 49 (Fig. 2). As the shaft 46 moves upwardly, (Fig. 13) it compresses the spring 55, thereby causing the latter to move the tube T and cap C' to bring the latter into engagement with the end of the formed filter medium F, the flange f of the tube T over the lower end of the bushing B and the spinning tool 59 into engagement with the inner end of the bushing B to spin the same over the flange f at the top of the tube T. The plug 75 resists the upward pressure exerted by the spinning tool on the bushing so that a tight connection is produced and the plug is held in proper position for this purpose by the mandrel 18. After the spinning operation has been completed, the treadle 88 is released to open the motor circuit and actuate the valve 85 to cause elevation of the link 81 and return of the shaft 46 to original position. Next, the winding 35b is energized by manually closing normally open switch 37c to return valve arm 34' to original position, whereupon air is supplied to the cylinder 17 to lift the head 14 thereby permitting upward movement of the rod 41 with consequent operation of the valve 43 to energize the cylinder 33 to effect upward movement of the piston 32 and the return of the slides 26 to outermost position. The ring 100 is lifted by the head 31 to disengage the bushing B' of the finished filter from the sleeve 56. The finished filter is removed and a new composite cylinder is inserted for the next cycle.

Both switches 37a and 37c are of the push-button type normally spring-biased in open condition. As soon as pressure on them is released, they return from closed to open position.

We claim:
1. In combination, a mandrel having a plurality of radially movable wings, yieldable means for outwardly projecting said wings, means for locking said wings in retracted position, means for releasing said locking means, plungers radially movable between adjacent wings along paths having their outer limit beyond the projected position of said wings, means for effecting simultaneous reciprocation of said plungers, and means for effecting relative axial movement of said mandrel and plungers.

2. In combination, a mandrel having a plurality of radially movable wings, yieldable means for outwardly projecting said wings, means for locking said wings in retracted position, means for releasing said locking means, plungers radially movable between adjacent wings along paths having their outer limit beyond the projected position of said wings, means for effecting simultaneous reciprocation of said plungers to form into star-shape a cylindrical member interposed between said wings and plungers, means for effecting relative axial movement of said mandrel and plungers, and means for attaching caps to the ends of the star-shaped member.

3. In combination, a table, a plurality of plungers supported by said table for reciprocatory movement along radially arranged paths, means for effecting simultaneous reciprocation of said plungers, a mandrel arranged axially of said plungers and having a plurality of spring-pressed radially movable wings staggered with respect to said plungers, means for releasably retaining said wings in retracted position, and means for effecting axial movement of said mandrel relative to said table.

4. In combination, a table, a mandrel axially movable toward and away from said table, wings supported by said mandrel for radial movement relative thereto, resilient means pressing said wings outwardly, means carried by said mandrel and releasable by contact with said table for locking said wings in retracted position, means for reciprocating said mandrel, plungers supported by said table for radial reciprocation between adjacent wings, and means for simultaneously actuating said plungers.

5. In combination, a table, a mandrel axially movable toward and away from said table, wings supported by said mandrel for radial movement relative thereto, resilient means pressing said wings outwardly, means carried by said mandrel and releasable by contact with said table for locking said wings in retracted position, means for reciprocating said mandrel, plungers supported by said table for radial reciprocation between adjacent wings along paths having their outer limits beyond the projected position of said wings, means for effecting simultaneous reciprocation of said plungers to form into star-shape, a cylindrical member interposed between said wings and plungers, and means for attaching caps to the ends of the star-shaped member.

6. In combination, a bed, a plurality of radially slidable plungers supported by said bed, means for effecting reciprocation of said plungers, a mandrel movable into and out of the space between the inner ends of said plungers, a plurality of spring-pressed radial wings supported by said mandrel in offset relation to said plungers, means for locking said wings in retracted position including slidable members movable to release said wings, a platform centrally of said plungers, means normally holding said platform in position to be operatively engaged by said members upon movement of the mandrel into the space between the inner ends of the plungers and moving said platform from such position upon inward movement of the plungers, and means to effect reciprocation of said mandrel.

7. In combination, a bed, a plurality or radially slidable plungers supported by said bed, means for effecting reciprocation of said plungers, a platform centrally of said plungers supported for reciprocation in a direction perpendicular to the direction of movement of said plungers, and means normally holding said platform in one position and removing said platform from such position upon inward movement of the plungers.

8. In combination, a bed, a plurality of radially slidable plungers supported by said bed, means including a head and cables leading therefrom to said plungers for effecting simultaneous reciprocation of the latter, a platform supported by said head and arranged centrally of said plungers, and means for reciprocating said head.

9. In combination, a bed, a plurality of radially slidable plungers supported by said bed, means including a head and cables leading therefrom to said plungers for effecting simultaneous reciprocation of the latter, a platform supported by said head, a mandrel movable into and out of the space between the inner ends of said plungers, a plurality of spring-pressed radial wings supported by said mandrel in offset relation to said plungers, means for locking said wings in retracted position including slidable members movable to release said wings and operatively engageable with said platform upon movement of the mandrel into the space between the inner ends of said plungers with said plungers and wings in retracted position, means for effecting reciprocation of said mandrel, and means for effecting reciprocation of said head.

10. In combination, a bed, a plurality of radially slidable plungers supported by said bed, means including a head and cables leading therefrom to said plungers for effecting simultaneous reciprocation of the latter, a platform supported by said head, a mandrel movable into and out of the space between the inner ends of said plungers, a plurality of spring-pressed radial wings supported by said mandrel in offset relation to said plungers, means for locking said wings in retracted position including slidable members movable to release said wings and operatively engageable with said platform upon movement of the mandrel into the space between the inner ends of said plungers with said plungers and wings in retracted position, means for effecting reciprocation of said mandrel, and means controlled by the reciprocation of said mandrel for effecting reciprocation of said head.

11. In combination, a bed, a rotatable shaft supported for axial movement relative to said bed, means for effecting rotation and reciprocation of said shaft, a peening tool at the end of said shaft, a plate supported by said bed for swinging movement into and out of operative position in parallel relation to said bed over the end of said shaft and having an aperture coaxial with said shaft when said plate is in operative position, a holder slidably supported by said plate coaxial with said aperture, and means for exerting pressure on said holder to move and hold it in predetermined relation to said peening tool.

12. In combination, a bed, a rotatable shaft supported for axial movement relative to said bed, means for effecting rotation and reciprocation of said shaft, a peening tool at the end of said shaft, a plate supported by said bed for swinging movement into and out of operative position in parallel relation to said bed over the end of said shaft and having an aperture coaxial with said shaft when said plate is in operative position, a holder slidably supported by said plate coaxial with said aperture, means for exerting pressure on said holder to move and hold it in predetermined relation to said peening tool, a plurality of plungers slidably supported by said bed radially of said shaft, means for effecting reciprocation of said plungers toward and away from said shaft, and means for maintaining said plungers in their innermost positions during the period pressure is exerted on said holder.

13. In combination, a mandrel having a plurality of radially movable wings, yieldable means for outwardly projecting said wings, means for locking said wings in retracted position, means for releasing said locking means, plungers radially movable between adjacent wings along paths having their outer limit beyond the projected position of said wings, means for effecting movement of said mandrel into and out of the space between the ends of said plungers, and means controlled by reciprocation of said mandrel for effecting reciprocation of said plungers.

14. In combination, a table, a plurality of plungers supported by said table for reciprocatory movement along radially arranged paths, means for effecting simultaneous reciprocation of said plungers, a mandrel arranged axially of said plungers and having a plurality of spring-pressed radially movable wings staggered with respect to said plungers, means for releasably retaining said wings in retracted position, and means for effecting movement of said mandrel into and out of the space between the ends of said plungers.

15. In combination, a table, a mandrel axially movable toward and away from said table, wings supported by said mandrel for radial movement relative thereto, resilient means pressing said wings outwardly, means carried by said mandrel and releasable by contact with said table for locking said wings in retracted position, means for reciprocating said mandrel, plungers supported by said table for radial reciprocation between adjacent wings, means for effecting movement of said mandrel into and out of the space between the ends of said plungers, and means controlled by the reciprocation of said mandrel for effecting reciprocation of said plungers.

16. In combination, a bed, a plurality of radially slidable plungers supported by said bed, a mandrel movable into and out of the space between the inner ends of said plungers, a plurality of spring-pressed radial wings supported by said mandrel in offset relation to said plungers, means for locking said wings in retracted position including slidable members movable to release said wings, a platform centrally of said plungers, means normally holding said platform in position to be operatively engaged by said members upon movement of the mandrel into the space between the inner ends of the plungers and removing said platform from such position upon inward movement of the plungers, a first pneumatic means for effecting reciprocation of said mandrel, mechanism including a second pneumatic means for effecting reciprocation of said plungers and means responsive to the movement of said mandrel for controlling the supply of air to said second pneumatic means.

17. In combination, a bed, a plurality of radially slidable plungers supported by said bed, means including a reciprocating head and cables leading therefrom to said plungers for effecting reciprocation of the latter, a platform supported by said head, a mandrel movable into and out of the space between the inner ends of the plungers, a plurality of spring-pressed radial wings supported by said mandrel in offset relation to said plungers, means for locking said wings in retracted position including slidable members movable to release said wings and operatively engageable with said platform upon movement of the mandrel into the space between the inner ends of said plungers with said plungers and wings in retracted position, a first pneumatic means for effecting reciprocation of said mandrel, a second pneumatic means for effecting reciprocation of said head, and means responsive to movement of said mandrel to control the supply of air to said second pneumatic means.

18. In combination, a bed, a plurality of radially slidable plungers supported by said bed, a platform centrally of said plungers supported for reciprocation axially thereof, means for effecting simultaneous reciprocation of said plungers and platform, a mandrel movable into and out of the space between the inner ends of the plungers, a plurality of spring-pressed radial wings supported by said mandrel in offset relation to said plungers, means for locking said wings in retracted position including slidable members movable to release said wings and operatively engageable with said platform upon movement of the mandrel into the space between the inner ends of said plungers with said plungers and wings in retracted position, means for effecting rotation and reciprocation of said shaft, a peening tool at the end of said shaft, a plate supported by said bed for swinging movement into and out of operative position in parallel relation to said bed over the end of said shaft and having an aperture coaxial with said shaft when said plate is in operative position, and a holder slidably supported by said plate coaxial with said aperture, said mandrel being effective to exert pressure on said holder to move and maintain it in predetermined relation to said peening tool.

19. In the combination according to claim 18, means for maintaining said plungers in their innermost position during the period that the mandrel is exerting pressure on said holder.

20. In combination, a bed, a rotatable shaft supported for axial movement relative to said bed, means for effecting rotation and reciprocation of said shaft, a peening tool at the end of said shaft, a plate supported by said bed for swinging movement into and out of operative position in parallel relation to said bed over the end of said shaft and having an aperture coaxial with said shaft when said plate is in operative position, a holder slidably supported by said plate coaxial with said aperture, and means for exerting pressure on said holder to move and hold it in predetermined relation to said peening tool, a plurality of plungers slidably supported by said bed radially of said shaft, means including a head and cables extending therefrom to said plungers for effecting reciprocation of said plungers toward and away from said shaft, and means actuated by said head for holding said plate in operative position.

ROBERT L. IRWINE.
JULIUS P. KOVACS.